US010594928B2

United States Patent
Swaminathan et al.

(10) Patent No.: US 10,594,928 B2
(45) Date of Patent: Mar. 17, 2020

(54) AUTOMATED ACTIVATION AND/OR CHARGING OF CAMERAS AND/OR AUTONOMOUS VEHICLES

(71) Applicant: Federal Signal Corporation, Oak Brook, IL (US)

(72) Inventors: Vishnu Swaminathan, Wilmette, IL (US); David Joseph Jablonsky, Hoffman Estates, IL (US); Scott Thomas Rohrbaugh, Clarendon Hills, IL (US)

(73) Assignee: Federal Signal Corporation, Oak Brook, IL (US)

( * ) Notice: Subject to any disclaimer, the term of this patent is extended or adjusted under 35 U.S.C. 154(b) by 225 days.

(21) Appl. No.: 15/479,704

(22) Filed: Apr. 5, 2017

(65) Prior Publication Data

US 2017/0324897 A1   Nov. 9, 2017

Related U.S. Application Data

(60) Provisional application No. 62/330,997, filed on May 3, 2016.

(51) Int. Cl.
*H04N 5/232* (2006.01)
*H04N 7/18* (2006.01)
(Continued)

(52) U.S. Cl.
CPC ....... *H04N 5/23222* (2013.01); *B64C 39/024* (2013.01); *B64D 47/08* (2013.01);
(Continued)

(58) Field of Classification Search
CPC ...... H04N 5/23222; H04N 5/77; H04N 5/232; G08G 1/0175; G08G 1/054
See application file for complete search history.

(56) References Cited

U.S. PATENT DOCUMENTS 6,967,462 B1   11/2005   Landis
7,525,568 B2 *  4/2009   Raghunath ............. H04N 5/782
                                                         340/539.21
(Continued)

FOREIGN PATENT DOCUMENTS

CN         102 868 232 A        1/2013

OTHER PUBLICATIONS

Smart Key technology: https://en.wikipedia.org/wiki/Smart_key#Inside_Outside_detection, Mar. 14, 2017, 8 pages.
(Continued)

*Primary Examiner* — Luis Perez-Fuentes
(74) *Attorney, Agent, or Firm* — Merchant & Gould P.C.

(57) ABSTRACT

A body camera can include: a camera configured to capture images; and a sensor module programmed to: sense a strength of a field within an emergency vehicle; activate the camera when the strength of the field falls below a certain threshold; and deactivate the camera when the strength of the field exceeds the threshold. The body camera can include a receiver configured to wirelessly receive power from an energy source within the emergency vehicle. An autonomous vehicle can also be carried by the emergency vehicle, with the autonomous vehicle being configured to be automatically activated and/or charged.

13 Claims, 3 Drawing Sheets

(51) Int. Cl.

| | | |
|---|---|---|
| *H04W 52/02* | (2009.01) | |
| *H02J 50/10* | (2016.01) | |
| *B64C 39/02* | (2006.01) | |
| *B64D 47/08* | (2006.01) | |
| *G05D 1/12* | (2006.01) | |
| *H02J 7/02* | (2016.01) | |
| *H04N 5/225* | (2006.01) | |
| *B60L 53/00* | (2019.01) | |

(52) U.S. Cl.
CPC ............... *G05D 1/12* (2013.01); *H02J 7/025* (2013.01); *H02J 50/10* (2016.02); *H04N 5/2251* (2013.01); *H04N 5/23241* (2013.01); *H04N 7/188* (2013.01); *H04W 52/0251* (2013.01); *B60L 53/00* (2019.02); *B64C 2201/042* (2013.01); *B64C 2201/127* (2013.01); *Y02D 70/164* (2018.01)

(56) References Cited

U.S. PATENT DOCUMENTS

| | | | |
|---|---|---|---|
| 8,781,292 B1 | 7/2014 | Ross et al. | |
| 9,002,313 B2 | 4/2015 | Sink et al. | |
| 9,184,595 B2 | 11/2015 | Kurs et al. | |
| 10,181,729 B1* | 1/2019 | DeVaul | H02J 50/12 |
| 2003/0214585 A1* | 11/2003 | Bakewell | G08G 1/054 |
| | | | 348/148 |
| 2012/0120258 A1 | 5/2012 | Boutell et al. | |
| 2013/0007949 A1 | 1/2013 | Kurs et al. | |
| 2013/0328616 A1 | 12/2013 | Buttolo et al. | |
| 2014/0270689 A1 | 9/2014 | Chau et al. | |
| 2014/0313411 A1* | 10/2014 | Merritt | H04N 21/41407 |
| | | | 348/469 |
| 2015/0002086 A1 | 1/2015 | Matos et al. | |
| 2015/0086175 A1* | 3/2015 | Lorenzetti | H04N 9/8211 |
| | | | 386/226 |
| 2015/0155738 A1 | 6/2015 | Leabman et al. | |
| 2016/0233946 A1* | 8/2016 | Wengrovitz | H04W 4/90 |
| 2016/0366376 A1* | 12/2016 | Merritt | H04N 21/41407 |
| 2017/0300759 A1* | 10/2017 | Beard | G06K 9/00771 |

OTHER PUBLICATIONS

International Search Report and Written Opinion in PCT/US2017/026085 dated Jul. 4, 2017, 20 pages.

\* cited by examiner

US 10,594,928 B2

AUTOMATED ACTIVATION AND/OR CHARGING OF CAMERAS AND/OR AUTONOMOUS VEHICLES

BACKGROUND

Following a number of recent high-profile law enforcement and civilian encounters, body cameras worn on a police officer's body have been featured in news reports as a better way to document these interactions, to ensure police accountability, and to maximize public trust. Body cameras are also seen by many police agencies as a technology that can provide the public with visual evidence of the interactions. As body cameras gradually enter the mainstream among law enforcement agencies, police departments seek a system with a specific set of features that enables seamless integration of body camera use into an officer's regular routine with minimal intervention.

Many body camera manufacturers provide on/off switches to manually control operation of the body camera. This places the responsibility on the police officers to remember to activate the body camera when they exit their police vehicle and deactivate the body camera when they re-enter their police vehicle.

Further, since body cameras generally possess a compact form, their batteries are small in size and therefore limited in capacity. The recording time is therefore typically restricted to only a few hours, much less than the required 8-12 hour duration of an officer's shift. Body camera manufacturers typically provide 8-10 hours of battery life between recharges with 4 hours of recording time. Body cameras are typically required to be placed in a docking station for recharging. The docking station could be at the police station or in the vehicle. In either case, recharging the battery requires that the body camera be physically removed from the officer's body and placed in the dock, thus resulting in an inconvenient recharge procedure for the user.

SUMMARY

The present disclosure is directed to systems that facilitate the automated activation and/or charging of the body cameras and/or autonomous vehicles.

In one aspect, a body camera includes: a camera configured to capture images; and a sensor module programmed to: sense a strength of a field within an emergency vehicle; activate the camera when the strength of the field falls below a certain threshold; and deactivate the camera when the strength of the field exceeds the threshold.

In another aspect, a system for automatic activation of a body camera includes: an emergency vehicle including a controller programmed to emit a field within an interior of the emergency vehicle; and the body camera configured to be worn by an occupant of the emergency vehicle and including a camera configured to capture images, the camera including a sensor module programmed to sense a strength of a field within an emergency vehicle and to: activate the camera when the strength of the field falls below a certain threshold; and deactivate the camera when the strength of the field exceeds the threshold.

In yet another aspect, a system for automatic activation of a body camera includes: an emergency vehicle including: a controller programmed to emit a field within an interior of the emergency vehicle; and a magnetic resonator positioned with in a set of the emergency vehicle and programmed to emit power; and the body camera configured to be worn by an occupant of the emergency vehicle, the body camera including: a camera configured to capture images, the camera including a sensor module programmed to sense a strength of a field within an emergency vehicle and to: activate the camera when the strength of the field falls below a certain threshold; and deactivate the camera when the strength of the field exceeds the threshold, wherein the strength of the field decreases as a distance between the body camera and the emergency vehicle increases; and a magnetic resonator receiver configured to wirelessly receive the power from the magnetic resonator within the emergency vehicle.

DETAILED DESCRIPTION

The present disclosure is directed to systems that facilitate the automated activation and/or charging of the body cameras and/or autonomous vehicles. In some examples, the body cameras and/or autonomous vehicles are configured to automatically activate and deactivate. In other examples, the body cameras and/or autonomous vehicles are configured to automatically charge. In yet other examples, the body cameras and/or autonomous vehicles are configured to automatically activate/deactivate and charge.

Figure 1:
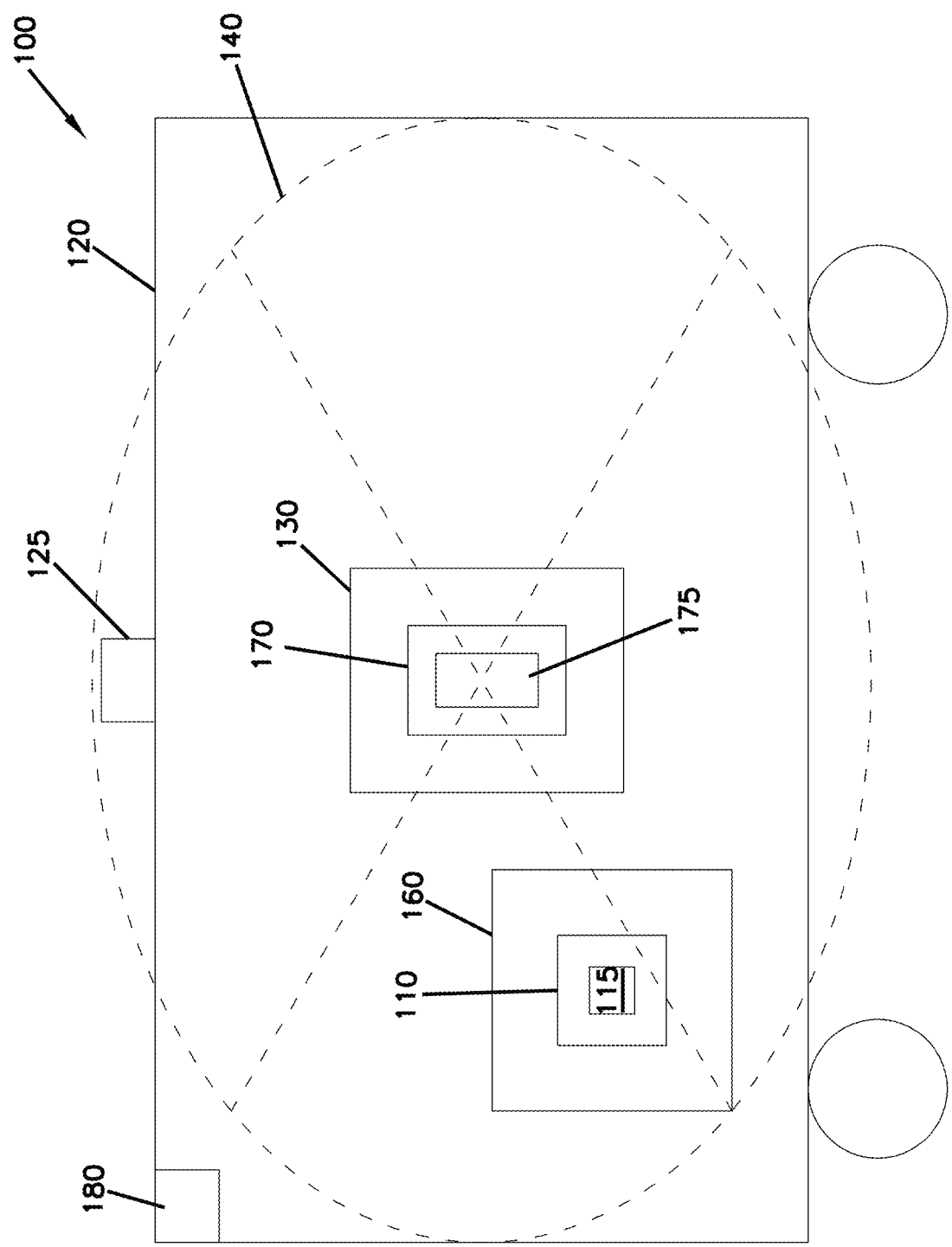
FIG. 1 is a schematic view of an example system configured for automatic activation of a body camera.

Referring now to FIG. 1, an example system 100 includes a body camera 110 that is worn by a user 160, such as a police officer or other first responder. The body camera 110 is configured to be activated based on the proximity of the body camera 110 to a vehicle 120, such as a police vehicle or other type of first responder vehicle (such as a fire truck, ambulance, etc.).

This embodiment does not necessarily require communication between a controller 130 in the vehicle 120 and the body camera 110. Instead, a localized electromagnetic field 140 is initiated by the controller 130 within the confines of the vehicle 120. The presence of this field 140 is sensed by an electronic field sensor module 115 residing within the body camera 110.

When the user 160 exits the vehicle 120, the electronic field sensor module 115 detects the absence of the field 140 and therefore activates the body camera 110. Once activated, the body camera 110 captures images, video, and/or audio. When the user 160 re-enters the vehicle 120, the presence of the field 140 is sensed again and the body camera 110 is deactivated.

The example system 100 includes a field generator 170 and/or one or more antennas 175 located within the vehicle 120 to generate the field 140 such that a desired portion and/or an entirety of the interior of the vehicle 120 is spatially covered by the field 140. In this example, the field 140 is a radio frequency (RF) field created by the field generator 170. In other examples, other types of fields (e.g., an infrared field) can be used.

The body camera 110 includes the electronic field sensor module 115 incorporated into or otherwise associated/attached to the body camera 110 such that: (i) the electronic field sensor module 115 activates the body camera 110 when the field 140 strength falls below a certain threshold, and (ii)

the electronic field sensor module 115 deactivates the body camera 110 when the field 140 strength exceeds the threshold.

In another embodiment, activation of a light bar 125 of the vehicle 120 deactivates the field 140 within the vehicle 120. Since no field 140 is present within the vehicle 120, the electronic field sensor module 115 on the body camera 110 activates the recording function of the body camera 110.

In another embodiment, the light bar 125 deactivates the field 140 within the vehicle 120 which, in turn, activates the recording function of an in-vehicle mounted camera 180.

Other configurations are possible. For example, other triggers can be configured to deactivate the field 140. For example, in another embodiment (or in supplement to the embodiments already disclosed), activation of other systems and/or components associated with the vehicle 120 can cause deactivation of the field 140, such as: (i) the manual or automated activation of the in-vehicle mounted camera 180; (ii) certain speed thresholds for the vehicle, such as the vehicle exceeding a threshold (e.g., 65 MPH) or exceeding a known speed limit by a threshold (e.g., by 5, 10, 15 or 20 MPH); and/or (iii) detection of a crash for the vehicle. Any or all of these additional triggers can be used to deactivate the field 140 and therefore cause the electronic field sensor module 115 on the body camera 110 to activate the recording function of the body camera 110.

Figure 2:
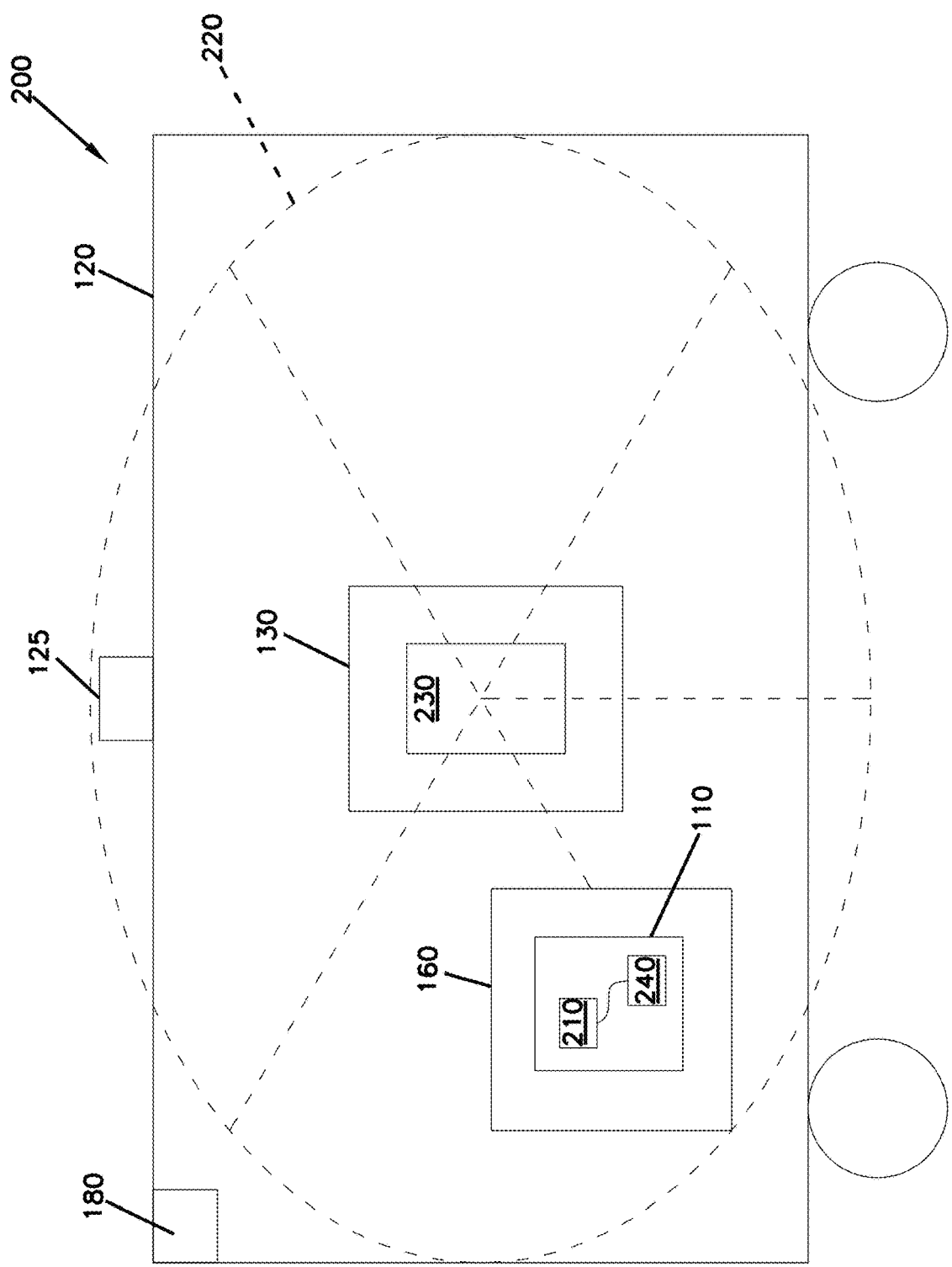
FIG. 2 is a schematic view of another example system configured for automatic charging of a body camera.

Referring now to FIG. 2, in another example a system 200, the vehicle 120 is configured to automatically charge the body camera 110. In this example, the vehicle 120 is configured to wirelessly charge one or more batteries 210 in the body camera 110 using electromagnetic methods (such as magnetic resonance and/or inductive coupling) to wirelessly transfer power to the batteries 210. In this configuration, the user 160 can continue to wear the body camera 110 without worrying about battery life, as the body camera's 110 battery or batteries 210 could be wirelessly recharged while worn.

In such a configuration, an oscillating magnetic field 220 is created by a magnetic resonator 230 by the controller 130 in the interior of the vehicle 120. The body camera 110 is equipped with a corresponding magnetic resonator 240 that acts an energy receiver. When the user 160 is within the vehicle 120, the magnetic resonator 240 attached to the body camera 110 on the user's 160 body is within the field 220 and charges the battery 210 without any need for removing the body camera 110, manually connecting recharging cables, or other such actions by the officer.

The example system 200 includes the magnetic resonator 230 installed in the vehicle 120 that creates the field 220 within the interior of the vehicle 120. In some examples, the magnetic resonator 230 is located in close proximity to the user 160, such as within the seat or dashboard of the vehicle 120, although other configurations are possible. The magnetic resonator 240 is incorporated into the body camera 110 (or can be removably attached or associated therewith) and is capable of converting energy from the field 220 into electrical power in a form suitable for charging the battery 210. The battery 210 is a rechargeable battery installed in the body camera 110 and is used as the power source of the body camera 110. In example embodiments, the battery 210 is a lithium ion battery. Other types of batteries, such as nickel cadmium, nickel-metal hydride, and/or lithium polymer, can be used.

In another embodiment, activation of the light bar 125 turns off the field 220 which, in turn, triggers the body camera 110 and/or in-vehicle mounted camera 180.

In yet another embodiment, the field 220 created for the purposes of wireless charging is the same field 140 used for activation and deactivation of the body camera 110.

Figure 3:
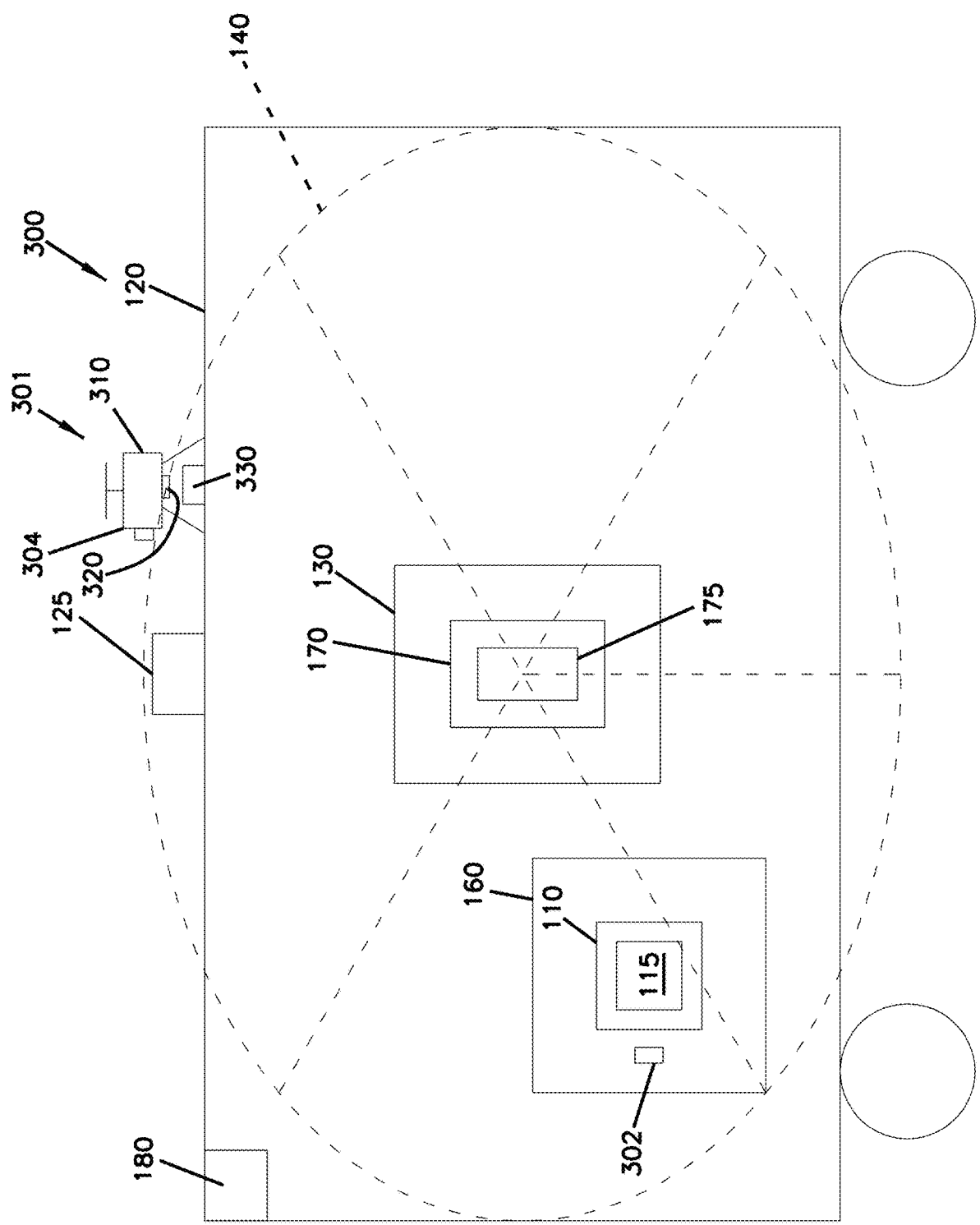
FIG. 3 is a schematic view of another example system configured for automatic activation and/or charging of an autonomous vehicle.

Referring now to FIG. 3, another example system 300 is shown that includes an autonomous vehicle 301. The autonomous vehicle 301 can be configured to be automatically activated and/or automatically charged.

In this example, the autonomous vehicle 301 is an unmanned aerial vehicle, which is commonly referred to as a drone 310. The drone 310 is positioned on the vehicle 120 so that the vehicle 120 carries the drone 310. The drone 310 is configured to lift off of the vehicle 120, fly, and land on the vehicle 120 in a semi- or automatic manner.

Specifically, the drone 310 can be programmed to be automatically activated using one or more of the criteria described herein.

For example, the drone 310 can be programmed to automatically fly from the vehicle 120 when certain criteria are met, such as the absence of the localized magnetic field 140 (when, for example, the light bar 125 is activated) and the vehicle 120 is stationary. In this example, the drone 310 is configured to sense the presence and/or absence of the field 140 (e.g., the relative strength of the same as compared to a threshold), which can be controlled by the controller 130. The controller 130 can cause the field 140 to be turned off when the light bar 125 is activated. Further, the drone 310 is configured to determine when the vehicle 120 is stationary, such as by using an onboard GPS and/or receiving a signal from the vehicle 120 and/or the controller 130 that the vehicle 120 is stopped. When these criteria are met (i.e., lack of field and vehicle stationary), the drone 310 automatically flies.

In another example, the drone 310 can be programmed to automatically fly when the user exits the vehicle 120. This can be accomplished several ways. For example, the drone 310 can be programmed to communicate with the body camera 110 so that when the body camera 110 is activated (e.g., when the user exits the vehicle and the field is absent), a signal is sent to the drone 310 to be activated. This can be a direct communication between the body camera 110 and the drone 310 or through an indirect communication, such as between the body camera 110, the controller 130, and to the drone 310.

Once the drone 310 flies, the drone 310 can be manually or automatically controlled. In the automated scenarios, the drone 310 can be configured to automatically follow the user 160 at a specified distance, such as 5, 10, 15, 20, and/or 50 feet. The user 160 can wear a beacon 302 that allows the drone 310 to track and follow the user 160.

In addition, the drone 310 can include a camera 304 that captures the user 160 and the user's environment as the drone 310 follows the user 160. In these examples, the drone 310 can be used for surveillance, rescue and/or other applications. The camera 304 can automatically be activated when the drone 310 flies and/or be activated using other criteria, such as a command from the user 160 and/or controller 130. The drone 310 can include internal memory to store the images captured by the camera 304. The drone 310 can also be programmed to stream or otherwise wirelessly download the images to, for example, the controller 130 or another computing device.

When the drone 310 is positioned on the vehicle 120, the drone 310 can be automatically charged. As depicted, the drone 310 includes a battery 320 that powers the drone 310 during use (e.g., during flight and while images are captured). When in proximity to a charger 330 on the vehicle 120, the battery 320 is charged. This can include wireless charging (as depicted in FIG. 3). The charging can also be through wires, such as when a dock is provided when the drone 310 lands on the vehicle 120 to make an electrical connection between the charger 330 and the battery 320.

In some examples, the drone 310 is programmed to manage its power so that the drone 310 automatically returns to the vehicle 120 for recharging when the battery 320 is depleted. In yet other examples, multiple drones can be provided. When a first drone depletes its battery, a second drone carried by the vehicle can be automatically sent to replace the first drone, and the first drone can return to the vehicle for charging. This can continue with additional drones and/or a recharged drone replacing another depleted drone.

Other configurations are possible. For example, although the drone 310 is shown to be mounted to a roof of the vehicle 120, other positions can be used. For example, the drone 310 can be carried within the vehicle 120 or positioned on the outside of other portions of the vehicle 120.

Further, other types of autonomous vehicles can also be used. For example, an autonomous vehicle that drives on land and/or water could also be carried by the vehicle 120 and programmed to automatically activate and/or automatically charge as described herein.

Other configurations of the systems, devices, and methods described herein are possible. For example, in an alternative embodiment, the status of the charging of the body camera can be used as the trigger for activation (in conjunction with and/or instead of the field within the vehicle). In this embodiment, the body camera remains inactive when charging within the vehicle. As the user leaves the vehicle and the body camera stops charging (due to the distance between the magnetic resonators), the body camera can be programmed to automatically turn on. The body camera can continue to record until turned off by, for example, automatically deactivating itself when charging begins again after the user returns to the vehicle.

In the examples provided herein, the controller, body camera, and/or autonomous vehicle are computing devices. These computing devices can include at least one central processing unit ("CPU"), a system memory, and a system bus that couples the system memory to the CPU. The system memory includes a random access memory ("RAM") and a read-only memory ("ROM"). The computing devices can further include a mass storage device. The mass storage device is able to store software instructions and data.

The mass storage device and its associated computer-readable data storage media provide non-volatile, non-transitory storage for the computing devices. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing devices.

According to various embodiments of the invention, the computing devices may operate in a networked environment using logical connections to remote network devices through a network, such as a wireless network, the Internet, or another type of network. The computing devices may also include an input/output controller for receiving and processing input from a number of other devices, including a touch user interface display screen, or another type of input device. Similarly, the input/output controller may provide output to a touch user interface display screen or other type of output device.

As mentioned, the mass storage device and the RAM of the computing devices can store software instructions and data. The software instructions include an operating system suitable for controlling the operation of the computing devices. The mass storage device and/or the RAM also store software instructions, that when executed by the CPU, cause the computing devices to provide the functionality of the controller and/or body camera discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. An assembly, comprising:
an emergency vehicle including
    a controller to emit a field within an interior of the emergency vehicle; and
    a body camera configured to be worn by an occupant of the emergency vehicle and including
        a camera configured to capture images, the camera including a sensor to sense a strength of the field within an emergency vehicle and to:
        activate the camera when the strength of the field falls below a certain threshold; and
        deactivate the camera when the strength of the field exceeds the threshold.

2. The assembly of claim 1, wherein the strength of the field decreases as a distance between the body camera and the emergency vehicle increases.

3. The assembly of claim 1, wherein the field is a radio frequency signal generated by the controller in the emergency vehicle.

4. The assembly of claim 1, further comprising a receiver configured to wirelessly receive power from an energy source within the emergency vehicle.

5. The assembly of claim 4, wherein the receiver is a body camera magnetic resonator configured to wirelessly receive power from a field generated within the emergency vehicle.

6. The assembly of claim 5, wherein the body camera magnetic resonator is positioned so that the power is received when a user is positioned in the emergency vehicle.

7. The assembly of claim 6, wherein the body camera magnetic resonator is positioned so that the power is received from a magnetic resonator positioned in a seat of the emergency vehicle.

8. The assembly of claim 1, further comprising an autonomous vehicle carried by the emergency vehicle, wherein the autonomous vehicle captures images.

9. The assembly of claim 8, wherein the autonomous vehicle is a drone.

10. The assembly of claim 8, wherein the autonomous vehicle is automatically activated.

11. The assembly of claim 10, wherein the autonomous vehicle is automatically activated based upon the strength of the field.

12. The assembly of claim 11, wherein the autonomous vehicle is automatically activated when the strength of the field falls below a threshold and the emergency vehicle is stopped.

13. An assembly, comprising:
- an emergency vehicle including:
  - a controller to emit a field within an interior of the emergency vehicle; and
  - a magnetic resonator positioned within a set distance of the emergency vehicle to emit power; and
- a body camera configured to be worn by an occupant of the emergency vehicle, the body camera including:
  - a camera configured to capture images, the camera including a sensor to sense a strength of the field within the emergency vehicle and to:
  - activate the camera when the strength of the field falls below a certain threshold; and
  - deactivate the camera when the strength of the field exceeds the threshold,
  - wherein the strength of the field decreases as a distance between the body camera and the emergency vehicle increases; and
- a magnetic resonator receiver configured to wirelessly receive the power emitted from the magnetic resonator within the emergency vehicle to charge the body camera.

* * * * *